(12) United States Patent
Kwentus et al.

(10) Patent No.: US 8,867,538 B2
(45) Date of Patent: Oct. 21, 2014

(54) ETHERNET MEDIA CONVERTER SUPPORTING HIGH-SPEED WIRELESS ACCESS

(71) Applicant: Broadcom Corporation, Irvine, CA (US)

(72) Inventors: Alan Kwentus, Coto de Caza, CA (US); Hassaan Aslam, Rancho Santa Margarita, CA (US); Ali Abaye, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 116 days.

(21) Appl. No.: 13/721,898

(22) Filed: Dec. 20, 2012

(65) Prior Publication Data

US 2014/0177610 A1    Jun. 26, 2014

(51) Int. Cl.
*H04W 88/18* (2009.01)
(52) U.S. Cl.
CPC .................................. *H04W 88/181* (2013.01)
USPC ............................ 370/389; 370/401; 370/310
(58) Field of Classification Search
None
See application file for complete search history.

(56) References Cited

U.S. PATENT DOCUMENTS

| 7,869,355 B2 * | 1/2011 | Kodama et al. | 370/230 |
| 2011/0090782 A1 * | 4/2011 | Bianchi et al. | 370/201 |
| 2012/0039198 A1 * | 2/2012 | Yang et al. | 370/252 |

* cited by examiner

*Primary Examiner* — Duc C Ho
(74) *Attorney, Agent, or Firm* — Oblon, Spivak, McClelland, Maier & Neustadt, L.L.P.

(57) ABSTRACT

Disclosed are method and system for Ethernet media conversion supporting high-speed wireless access points. The method includes receiving at each of a plurality of input-side Ethernet modules in a media converter, a plurality of input data streams at a first data rate. In the media converter each of the plurality of input data streams may be aggregated into an output data stream at a second data rate. The output data stream may then be transmitted at the second data rate from an output-side Ethernet module in the media converter. Each of the input data streams may be received from an Ethernet switch, and the output data stream may be transmitted to a wireless access point. In one exemplary implementation, each of the input-side Ethernet modules may include a 1G PHY, while the output-side Ethernet module may include one or both of a 2.5G PHY and a 4G PHY.

15 Claims, 4 Drawing Sheets

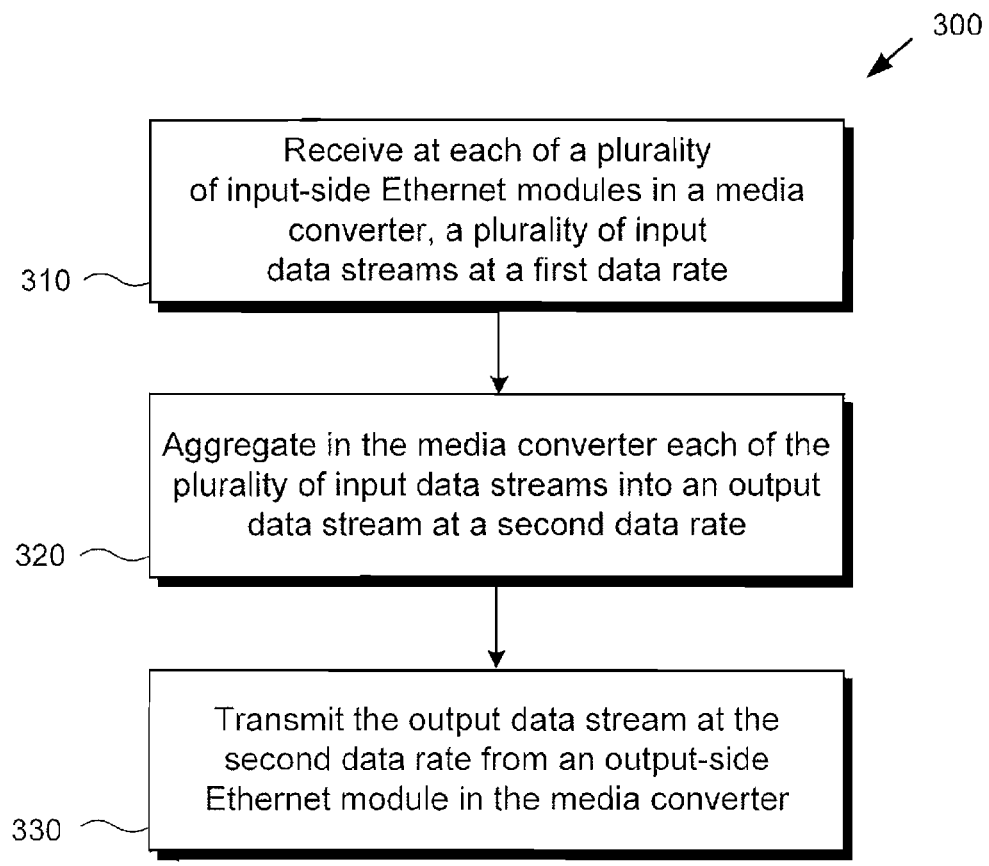

ETHERNET MEDIA CONVERTER SUPPORTING HIGH-SPEED WIRELESS ACCESS

BACKGROUND

In the field of wireless communications, data transmission rates continue to increase. In response, newer communications standards are developed when previous communication standards are no longer able to accommodate the higher data transmission rates. However, as each new communication standard is developed, electronic devices designed to support a previous communication standard may become obsolete because the devices are not compatible with the new communications standard. As a result, many costly equipments may need to be replaced in order for enterprise intranets and other networks to function at the higher data rates associated with the new communications standard. Because the time interval between the development of one new standard and the next continues to shrink, the accelerating progress in high-speed communications can present a continuous and substantial financial burden to the marketplace.

For example, existing technology supports data rates of 1-Gigabit per second (1 G) or 10-Gigabits per second (10 G). However, with the adoption of more recent communication standards, 1 G operability may not be sufficient, while 10 G operability may require power consumptions that are too high for continuous, cost-effective operation.

SUMMARY

The present disclosure is directed to an Ethernet media converter supporting high-speed wireless access points, substantially as shown in and/or described in connection with at least one of the figures, and as set forth more completely in the claims.

BRIEF DESCRIPTION OF THE DRAWINGS

FIG. 3 presents an exemplary flowchart illustrating a method for use by a media converter supporting high-speed wireless access points, according to an implementation of the present application.

DETAILED DESCRIPTION

Figure 1:
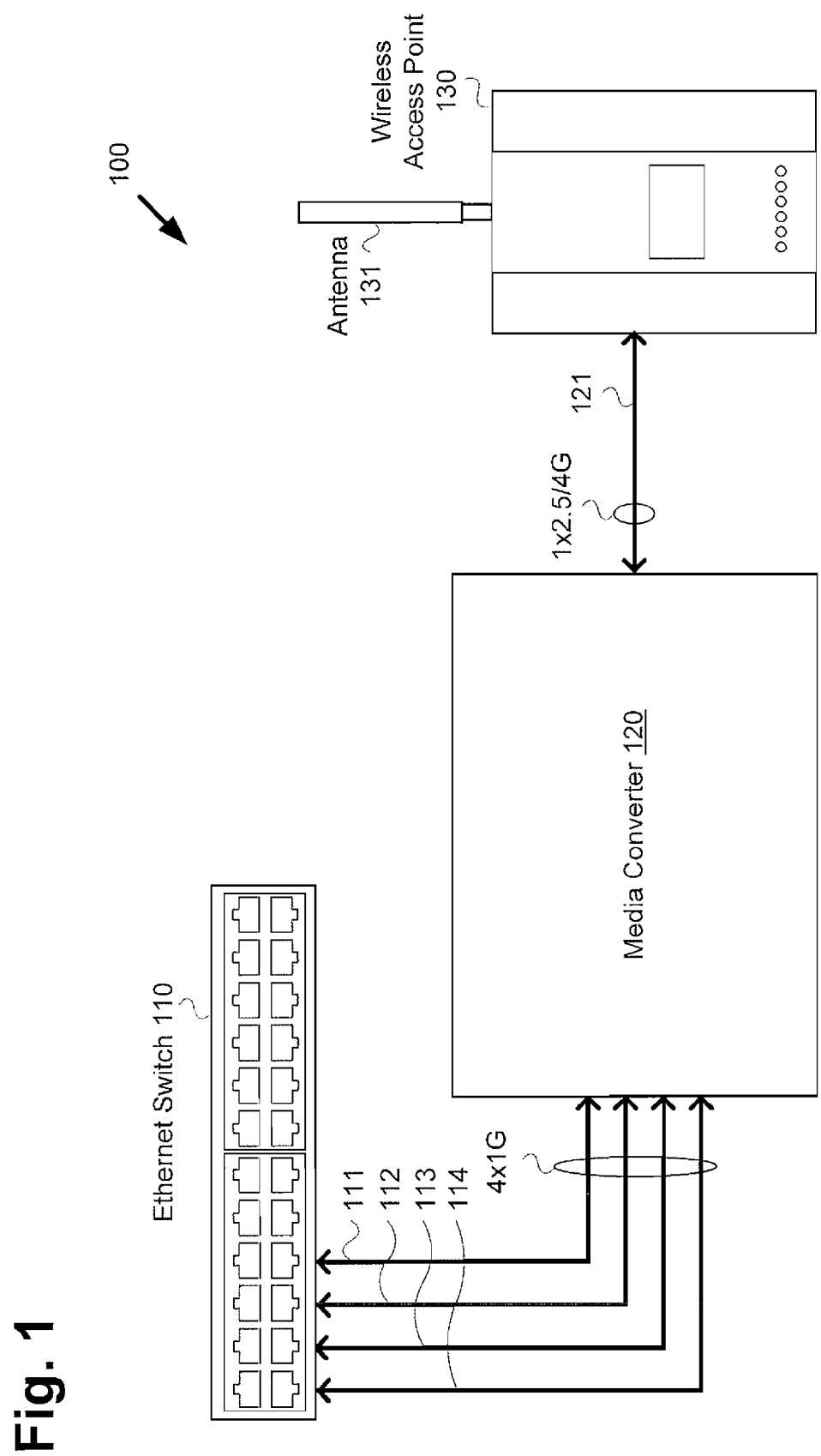
FIG. 1 presents an exemplary diagram of a system including a media converter supporting high-speed wireless access points, according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

One of the most widely utilized IEEE standards for wireless communication is the 802.11g standard. Many enterprise environments provide wireless access throughout one or more buildings by mounting multiple 802.11g-compatible wireless access points in the walls or ceilings. Each access point may be interconnected and receive power from one or more Ethernet switches via Ethernet cabling, typically category 5 or higher cabling. Using, for example, a 1 G Ethernet switch, Gigabit Ethernet may be provided over the cabling between the Ethernet switch and one or more 1 G wireless access points. However, 802.11g wireless access points are capable of communicating at data rates only up to a certain level.

Thus, with the transition to the IEEE 802.11ac standard, which provides for data rates far in excess of 1 G, the infrastructure including 1 G Ethernet switches cannot support the increased data rates available to 802.11ac wireless access points. Accordingly, for many enterprises, achieving multi-Gigabit data rates in their wireless networks would require the increased expenditures associated with replacing the 1 G Ethernet switches. The present application allows retaining existing 1 G switches utilizing a media converter to run higher data rates over standard Ethernet cables to wireless access points compatible with the 802.11ac communication standard, for example.

The media converter may receive two to four 1 G Ethernet data streams via two to four 1 G ports of a 1 G Ethernet switch, aggregate each of the 1 G Ethernet data streams within the media converter, and output a single 2.5-Gigabit per second (2.5 G) or 4-Gigabit per second (4 G) signal to a 2.5 G or 4 G wireless access point, respectively. Thus, the present application allows for wireless communication at higher data rates using already-installed 1 G Ethernet switches. In this manner, the present application provides substantial cost savings associated with the replacement of incompatible Ethernet switches in higher speed networks.

FIG. 1 presents an exemplary diagram of a system including a media converter supporting high-speed wireless access points, according to one implementation of the present application. For example, system 100 is configured to include at least Ethernet switch 110, media converter 120, and wireless access point 130. Ethernet switch 110 may be a 1 G Ethernet switch having a plurality of 1 G ports. However, Ethernet switch 110 is not so limited and may be any other appropriate type of Ethernet switch. Ethernet switch 110 may be connected to media converter 120 via two or more Ethernet links, such as Ethernet links 111, 112, 113 and 114 (hereinafter Ethernet links 111-114). Each of Ethernet links 111-114 may be a 1 G Ethernet link and may include a Cat5e Ethernet cable. However, Ethernet links 111-114 are not so limited and may be any appropriate type of Ethernet cable.

Media converter 120 may be connected to wireless access point 130 via Ethernet link 121, which may be a 2.5 G Ethernet link. In the alternative, Ethernet link 121 may be a 4-Gigabit (4 G) Ethernet link. Ethernet link 121 may comprise a Cat5e Ethernet cable or any other appropriate type of Ethernet cable.

Wireless access point 130 may include antenna 131, and may be enabled for wireless communication with one or more other wireless devices at a higher rate of, such as 2.5 G or 4 G, according to one or more IEEE standards, such as 802.11ac.

In operation, media converter 120 may be configured to receive a plurality of input data streams at a first data rate, for example 1 G per link. Media converter 120 may aggregate each of the plurality of input data streams into an output data stream at a second data rate, for example 2.5 G or 4 G. The aggregation may be carried out according to any number of appropriate multiplexing or aggregation standards as will be explained in further detail below. Media converter 120 may then transmit the output data stream at the second data rate over Ethernet link 121 to wireless access point 130. In this way, media converter 120 leverages existing 1 G switch ports without requiring any redesign on the switch side to provide an interim solution for supporting higher, 802.11ac data rates while retaining the lower data rate-compatible switch.

Figure 2A:
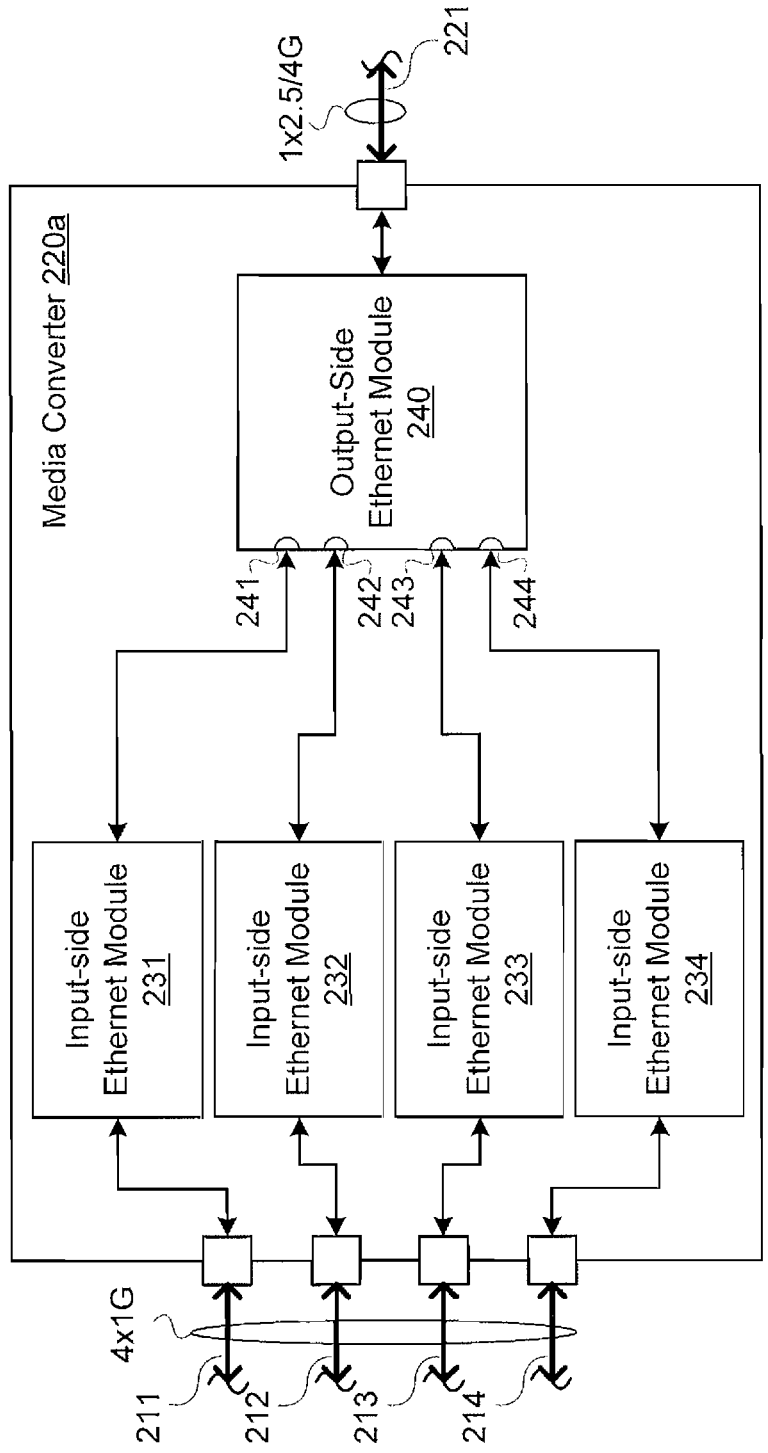
FIG. 2A presents an exemplary diagram of a media converter supporting high-speed wireless access points, according to one implementation of the present application.

FIG. 2A presents an exemplary diagram of a media converter supporting high-speed wireless access points, according to one implementation of the present application. Media converter 220a may be substantially similar to media converter 120 of FIG. 1. Media converter 220a may include at least input-side Ethernet modules 231, 232, 233 and 234 (hereinafter input-side Ethernet modules 231-234) and output-side Ethernet module 240. Media converter 220a may be configured to receive a respective input data stream to each of input-side Ethernet modules 231-234, at the first data rate, over Ethernet links 211, 212, 213 and 214 (hereinafter Ethernet links 211-214). Each of input-side Ethernet modules 231-234 may comprise a physical transceiver (PHY) including a Serial Gigabit Media Independent Interface (SGMII), and may be responsible for implementing the hardware send and receive functions for communicating Ethernet IP packets over Ethernet links 211-214. The PHY may be a 1 G PHY, however, the PHY is not so limited and may be a PHY capable of communicating at any rate less than a PHY of output-side Ethernet module 240, as discussed below.

Output-side Ethernet module 240 may include either a PHY, several SGMIIs at input terminals 241, 242, 243 and 244, and may be responsible for implementing the hardware send and receive functions for communicating Ethernet IP packets at the higher, second data rate over Ethernet link 221. Output-side Ethernet module 240 may also be configured to perform aggregation of each of the data streams from each of input-side Ethernet modules 231-234 in order to derive an output data stream at the second data rate. This aggregation will be discussed in more detail below.

The PHY within output-side Ethernet module 240 may be one of a 2.5 G PHY and a 4 G PHY. However, the PHY is not so limited and may be a PHY capable of communicating at any rate greater than a PHY of input-side Ethernet modules 231-234, as discussed above. In one implementation, the PHY may be a 10 G PHY that is underclocked by an appropriate multiple in order to achieve the appropriate second data rate of, for example, 2.5 G or 4 G at a substantially reduced power consumption as compared to 10 G operation. The output data stream may then be transmitted from output-side Ethernet module 240 over Ethernet link 221 to a wireless access point, such as wireless access point 130.

To avoid bottlenecking, output-side Ethernet module 240 may be configured to perform OSI level 2 or higher packet inspection in order to eliminate or appropriately reschedule certain data in order to reduce the amount of real-time aggregated data to match the output rate. In such a case, output-side Ethernet module 240 may be configured to drop idle frames from one or more of the input data streams coupled from input-side Ethernet modules 231-234. Output-side Ethernet module 240 may additionally be configured to prioritize data from the input data streams for transmission at the higher data rate, based on one or more metrics. Such idle dropping and/or data rescheduling and prioritization may be carried out according to any appropriate quality of service (QoS) communication specification known to those of ordinary skill in the art.

The term "module" as used in the present application is considered to mean a stand-alone circuit on a chip, or alternatively, a circuit integrated into a larger chip with one or more other circuits. Thus, in one implementation, two or more of input-side Ethernet modules 231-234 and output-side Ethernet module 240 may be disposed on a single chip within media converter 220a. Alternatively, each of input-side Ethernet modules 231-234 and output-side Ethernet module 240 may be disposed on separate chips within media converter 220a.

Figure 2B:
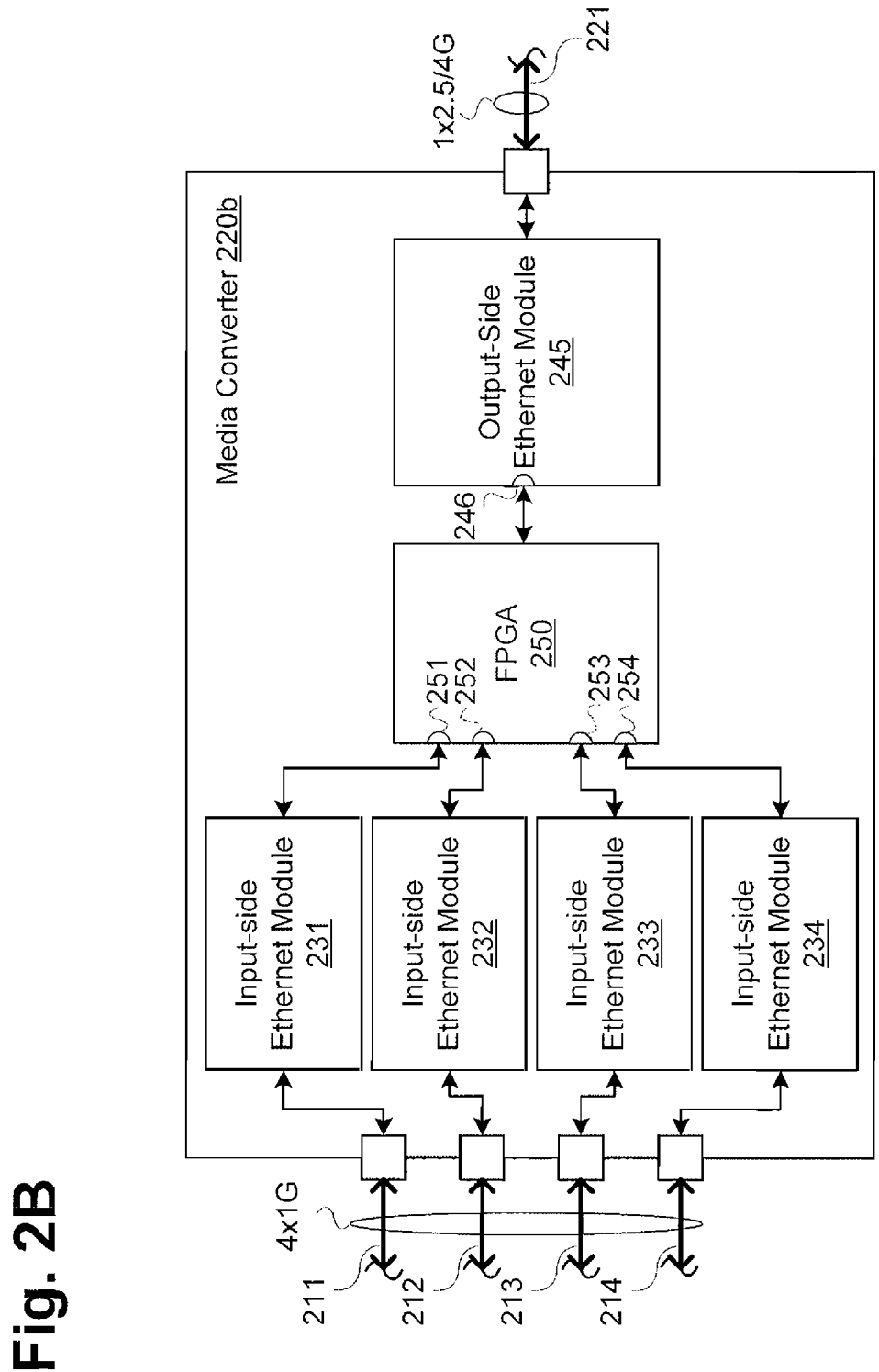
FIG. 2B presents an exemplary diagram of a media converter supporting high-speed wireless access points, according to another implementation of the present application.

FIG. 2B presents an exemplary diagram of a media converter supporting high-speed wireless access points, according to another implementation of the present application. Media converter 220b may be substantially similar to media converter 220a of FIG. 2A, except output-side Ethernet module 245 may only support a single SGMII, shown having single input terminal 246. Thus, media converter 220b additionally includes field programmable gate array (FPGA) 250, which supports several SGMIIs, as shown by input terminals 251, 252, 253 and 254. Here, FPGA 250 may be configured to perform the aggregation of each of the input data streams from each of input-side Ethernet modules 231-234 in order to derive the output data stream. The output data stream may then be communicated to output-side Ethernet module 245. Output-side Ethernet module 245 may comprise a PHY and may still be responsible for implementing the hardware send and receive functions communicating Ethernet frames at the higher, second data rate over Ethernet link 221 to a wireless access point, such as wireless access point 130.

To avoid bottlenecking, FPGA 250 may be configured to perform the OSI level 2 or higher packet inspection in order to eliminate or appropriately reschedule certain data in order to reduce the amount of real-time aggregated data to match the output rate. In such a case, FPGA 250 may be configured to drop idle frames from one or more of the input data streams from input-side Ethernet modules 231-234. FPGA 250 may additionally be configured to prioritize data from the input data streams for transmission at the higher data rate, based on one or more metrics. Such idle dropping and/or data rescheduling and prioritization may be carried out according to any appropriate quality of service (QoS) communication specification known to those of ordinary skill in the art.

As with FIG. 2A above, in one implementation, two or more of input-side Ethernet modules 231-234, FPGA 250 and output-side Ethernet module 245 may be disposed on a single chip within media converter 220b. Alternatively, each of input-side Ethernet modules 231-234, FPGA 250 and output-side Ethernet module 245 may be disposed on separate chips within media converter 220b.

FIG. 3 presents an exemplary flowchart illustrating a method for use by a media converter supporting high-speed wireless access points, according to an implementation of the present application. Flowchart 300 may begin with action 310 including receiving at each of a plurality of input-side Ethernet modules in a media converter, a plurality of input data streams at a first data rate. For example, each of input-side Ethernet modules 231-234 of FIGS. 2A and/or 2B may receive a respective input data stream at a data rate of 1 G from Ethernet switch 110.

Flowchart 300 may then proceed to action 320 including aggregating in the media converter each of the plurality of input data streams into an output data stream at a second data rate. Referring to FIG. 2A, aggregating may include coupling each of the plurality of input data streams to output-side Ethernet module 240 and deriving, within output-side Ethernet module 240, the output data stream at the second data rate of, for example, 2.5 G or 4 G, depending on the type of PHY output-side Ethernet chip 240 includes. Referring to FIG. 2B, aggregating may include coupling each of the plurality of input data streams to FPGA 250 and deriving, within FPGA 250, the output data stream at the second data rate.

Regarding aggregation, output-side Ethernet module 240 of FIG. 2A may be configured to concatenate or multiplex data from one or more tower-data-rate signals, such as each of the plurality of input data streams from each of input-side Ethernet modules 231-234, to a higher data rate stream, such as the output data stream transmitted from output-side Ethernet module 240 over Ethernet link 221. This aggregation may be performed by any appropriate set of actions, preexisting standards or protocols. For example, referencing FIG. 2A, each of the input data streams may be coupled to output-side Ethernet module 240 and saved into a respective input buffer. At the appropriate time, data from each of the input buffers may be concatenated and saved to an output buffer for transmission, at the higher data rate, from output-side Ethernet module 240. Data to be concatenated may be read from each input buffer such that data from each input stream may be concatenated to the output data stream in a particular order. Alternatively, data from each of the input data streams may be aggregated according to one or more priorities associated with a particular IP packet or a particular input data stream. In this manner, certain types of data or data from certain input data streams may be concatenated in a predetermined priority order.

Depending on the specific protocol used, complete IP packets from the input streams may be concatenated such that the original IP packet headers from each of the input stream IP packets are not discarded before concatenation. In the alternative, payload data from within each of the input stream IP packets may first be extracted, the original IP packet headers discarded, and new IP packet headers generated to reflect all concatenated data from one or more of the input data streams included in the new aggregated IP packet. Thus, aggregation may be similar to, or utilize a form of, add-drop multiplexing. Non-limiting examples of standardized protocols that utilize such add-drop multiplexing may include synchronous optical networking (SONET) and synchronous digital hierarchy (SDH) based communications.

Once aggregation has been performed, flowchart 300 may continue with action 330, which may include transmitting the output data stream at the second data rate from an output-side Ethernet module in the media converter. For example, output-side Ethernet module 240 or 245 of FIG. 2A or 2B, respectively, may transmit the output data stream at a data rate of, for example, 2.5 G or 4 G to a compatible wireless access point, such as wireless access point 130.

Thus, the present application allows for wireless communications at higher data rates, while retaining already-installed Ethernet switches. In this manner, the present application provides substantial cost savings to enterprises associated with the replacement of incompatible or outdated Ethernet switches in higher speed networks.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A method for use in wireless communication, said method comprising:
    receiving at each of a plurality of input-side Ethernet modules in a media converter, a plurality of input data streams at a first data rate;
    aggregating in said media converter each of said plurality of input data streams into an output data stream at a second data rate;
    transmitting said output data stream at said second data rate from an output-side Ethernet module in said media converter,
    wherein said output-side Ethernet module comprises a 10-Gigabit Ethernet PHY that is underclocked to provide said second data rate.

2. The method of claim 1, wherein said receiving comprises receiving each of said plurality of input data streams from an Ethernet switch.

3. The method of claim 1, wherein said transmitting comprises transmitting said output data stream to a wireless access point.

4. The method of claim 1, wherein said input data rate is lower than said output data rate.

5. The method of claim 1, wherein each of said plurality of said input-side Ethernet modules is a 1-Gigabit PHY.

6. The method of claim 1, wherein two or more of said input-side Ethernet modules and said output-side Ethernet module are disposed on a single chip.

7. The method of claim 1, wherein said aggregating comprises:
    coupling each of said plurality of input data streams to said output-side Ethernet module;
    deriving, within said output-side Ethernet module, said output data stream at said second data rate.

8. A method for use in wireless communication, said method comprising:
    receiving at each of a plurality of input-side Ethernet modules in a media converter, a plurality of input data streams at a first data rate;
    providing each of said plurality of input data streams to a field programmable gate array (FPGA) in said media converter;
    deriving, within said FPGA, and output data stream at a second data rate;
    providing said output data stream to an output-side Ethernet module in said media converter;
    transmitting said output data stream at said second it array from said output-side Ethernet module,
    wherein said output-side Ethernet module is a 4-Gigabit PHY.

9. The method of claim 8, wherein two or more of said input-side Ethernet modules, said FPGA and said output-side Ethernet module are disposed on a single chip.

10. A system for wireless communication, said system comprising:
    a media converter comprising a plurality of input-side Ethernet modules and an output-side Ethernet module;
    said plurality of input-side Ethernet modules being configured to receive a plurality of input data streams at a first data rate;
    said output-side Ethernet module being configured to aggregate each of said plurality of data streams into an output data stream at a second data rate;
    said output-side Ethernet module being further configured to transmit said output data stream at said second data rate, wherein each of said plurality of said input-side Ethernet modules is a 1-Gigabit PHY.

11. The system of claim 10, further comprising an Ethernet switch configured to provide said plurality of input data streams to said media converter.

12. The system of claim 10, further comprising a wireless access point configured to receive said second data stream from said media converter.

13. The system of claim 10, wherein two or more of said input-side Ethernet modules and said output-side Ethernet module are disposed on a single chip.

14. The system of claim 10, wherein said output-side Ethernet module is a 2.5-Gigabit PHY.

15. The system of claim 10, wherein said output-side Ethernet module is a 4-Gigabit PHY.

* * * * *